May 20, 1924.
W. O. JONES
ARTIFICIAL BAIT
Filed May 11, 1923
1,494,605
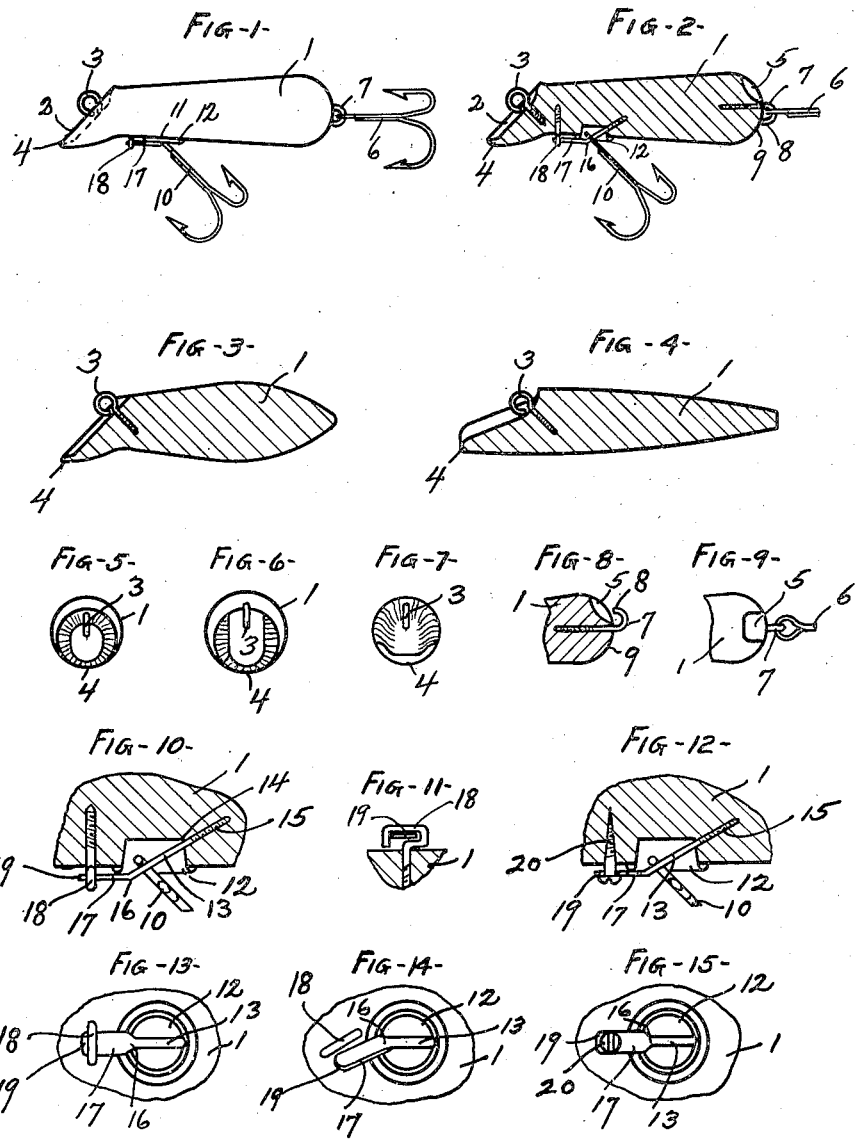
Walter O. Jones, Inventor

Patented May 20, 1924.

1,494,605

UNITED STATES PATENT OFFICE.

WALTER O. JONES, OF STRUTHERS, OHIO.

ARTIFICIAL BAIT.

Application filed May 11, 1923. Serial No. 638,259.

*To all whom it may concern:*

Be it known that I, WALTER O. JONES, a citizen of the United States of America, residing at Struthers, in the county of Mahoning and State of Ohio, have invented certain new and useful Improvements in Artificial Bait, of which the following is a specification.

This invention relates to improvements in artificial baits or lures.

The main objects of this invention are to provide an improved fish bait which is very efficient in catching fish and at the same time is durable, simple and economical in structure.

Further objects, and objects relating to structural details will definitely appear from the detailed description to follow:—

I accomplish the objects of my invention by the device and means described in the following specification:—

The invention is clearly defined and pointed out in the claims. A structure, which is a preferred embodiment of my invention is clearly illustrated in the accompanying drawing, forming a part of this specification, in which:—

Figure 1 is a side view of the device.

Figure 2 is a longitudinal section of Figure 1.

Figure 3 is a longitudinal section of a modification of Figure 1.

Figure 4 is a longitudinal section of another modification of Figure 1.

Figure 5 is a front end view of Figure 1.

Figure 6 is a front end view of Figure 3.

Figure 7 is a front end view of Figure 4.

Figure 8 is a section of end of Figure 2, showing eye in position for removing hooks.

Figure 9 is a top plan view of the eye as shown in Figures 2 and 8.

Figure 10 is an enlarged view of hook attaching portion of the device.

Figure 11 is a view of locking eye shown in Figure 10.

Figure 12 is a modification of Figure 10.

Figure 13 is a bottom view of Figure 10.

Figure 14 is a bottom view of Figure 10, showing attachment about to be closed.

Figure 15 is a bottom view of Figure 12.

By referring to the drawings, the body portion 1 is constructed of wood or other substances lighter than water and of suitable shape. This body portion 1 may be colored to attract fish. The front of the body portion 1 is provided with a substantially flat surface 2 which is surrounded at its outer edge with a ridge or raised rim 4, as shown in Figures 1 and 2. In the modified structure shown in Figure 3, the ridge or raised rim 4 surrounds all of surface 2 except a portion at the top. In the modified structure as shown in Figure 4 the ridge or raised rim 4 surrounds all of surface 2 except a portion at the bottom. A line attaching means is provided by the screw eye 3 which is screwed into surface 2. As the bait is pulled along, the action of the water against the surface 2 causes the bait to dive, wiggle and dart. This action is greatly increased by the ridge or rim 4.

My improved bait or lure is efficient and has novel and attracting features. I have not attempted to illustrate or describe certain other embodiments or adaptations as I believe the disclosure made will enable those skilled in the art to which my invention relates to embody or adapt the same as may be desired.

By referring to Figure 2 it will be seen by Figures 2, 8, and 9, that I have provided a recess 5 at the upper rear end of the body portion 1 which allows the hook 6 to be removed when the hook retainer 7 is turned, so that the curved end 8 points upwardly and over the recess 5. When the hook is to be replaced, the hook 6 is slipped over the curved end 8 turned down, so that the curved end 8 comes in close contact with the end portion 9 of the body portion 1.

By referring to Figure 1, it will be seen that the device provides a second hook 10 which is attached to the under side of the body portion 1 at point 11.

By referring to Figure 10 it will be seen that I have provided a socket 12 set into the under side of the body portion 1.

In order to secure the hook 10 in a detachable manner, I have provided a hook retainer 13 which penetrates the socket 12 at point 14 and turned into the body portion 1, so that the threaded end 15 is turned into the body portion 1. This hook retainer 13 has a slight bend at point 16, so that a flattened portion 17 of the hook retainer 13 may engage in an eye 18.

By referring to Figure 14 it will be seen that the hook retainer 13 may be slightly turned downwardly, and at the same time the eye 18, is turned longitudinally to the flattened portion 17 thereby releasing the end 19 of the flattened portion 17. After the hook 10 has been inserted over the hook retainer 13, the hook retainer 13 is turned slightly so that the end 19 enters the eye 18 and which is turned simultaneously with the hook retainer 13.

By referring to Figures 10 and 12 it will be seen that the hook 10 is now retained upon the hook retainer 13 so that when the artificial bait is travelling through the water, the hook will tend to travel to the uppermost point of the hook retainer 13 within the socket 12, and when the artificial bait is released from the line tension, the hook will tend to slip downwardly along this incline thereby causing the front end of the artificial bait to dip slightly and aiding in the movement caused by the surface 2 and the rim or ridge 4.

By referring to Figure 12 it will be seen that if desired, a screw 20 may be used to hold the end 19 in position in place of the eye 18.

What I claim is:—

1. In a device of the class described, a body portion provided with an inclined substantially flat depressed surface at the front end, a hook retainer secured at the rear end, a recess located directly above the securing point of the hook retainer substantially as described for the purpose set forth.

2. In a device of the class described, a body portion provided at the front end with a substantially flat surface completely surrounded at its outer edge with a raised ridge or rim, a hook retainer secured at the rear end so arranged as to release the rear hook by rotating the hook retainer less than a full turn, substantially as described for the purpose set forth.

3. In a device of the class described, a body portion provided at the front end with a substantially flat surface, said surface being partially surrounded by a raised ridge or rim, means of securing hooks at the rear end of said body, and means for securing hooks to the body at points between the ends of said body, said means being so arranged that the hooks may be released by rotating the retaining member less than a full turn, substantially as described for the purpose set forth.

In testimony whereof I affix my signature.

WALTER O. JONES.

Witnesses:
C. A. HARPMAN,
W. B. HARPMAN.